United States Patent
Abinal et al.

(10) Patent No.: US 6,609,549 B2
(45) Date of Patent: Aug. 26, 2003

(54) ASSEMBLY CONSISTING OF A RIM AND A BEARING SUPPORT

(75) Inventors: Richard Abinal, Veyre-Monton (FR); Thomas Emberger, Kipfenberg (DE); Jean-Pierre Pompier, Greenville, SC (US)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 10/034,104

(22) Filed: Dec. 20, 2001

(65) Prior Publication Data

US 2002/0124923 A1 Sep. 12, 2002

(30) Foreign Application Priority Data

Dec. 22, 2000 (FR) .............................. 00 17080

(51) Int. Cl.$^7$ ..................... B60B 21/12; B60C 17/04
(52) U.S. Cl. ..................... 152/400; 152/379.3; 152/520
(58) Field of Search ..................... 152/379.3, 379.4, 152/379.5, 381.3, 381.4, 381.5, 381.6, 516, 520

(56) References Cited

U.S. PATENT DOCUMENTS

| | | | | | |
|---|---|---|---|---|---|
| 4,248,286 | A | * | 2/1981 | Curtiss, Jr. et al. | 152/516 |
| 5,593,520 | A | * | 1/1997 | Boni et al. | 152/158 |
| 5,626,696 | A | * | 5/1997 | Boni et al. | 152/520 |
| 5,787,950 | A | * | 8/1998 | Muhlhoff et al. | 152/379.5 |
| 5,891,279 | A | * | 4/1999 | Lacour | 152/520 |
| 6,035,913 | A | * | 3/2000 | Bapt et al. | 152/381.4 |
| 6,092,575 | A | * | 7/2000 | Drieux | 152/158 |
| 6,415,839 | B1 | * | 7/2002 | Pompier et al. | 152/381.4 |

FOREIGN PATENT DOCUMENTS

| | | |
|---|---|---|
| EP | 0673324 | 9/1995 |
| EP | 0807539 | 11/1997 |
| EP | 1098779 | 2/2000 |
| EP | 1000774 | 5/2000 |
| FR | 2713558 | 6/1995 |
| FR | 2770459 | 5/1999 |
| FR | 2776963 | 10/1999 |
| WO | 0076791 | 12/2000 |
| WO | 0108905 | 2/2001 |

* cited by examiner

Primary Examiner—Russell D. Stormer

(57) ABSTRACT

An assembly including a deformable, inextensible tread-bearing support S, which can be slipped on to a suitable rim bearing surface (11). The bearing surface (11) extends axially towards the inside of a first rim seat (13'), which is in turn extended to the outside by a protrusion or hump (15') of low height. The first rim seat (13') is inclined towards the outside. A second rim seat (13") having, viewed in meridian section, a generatrix, the axially inner end of which is located on a circle of diameter $D''_A$ greater than the diameter of the circle on which is located the axially inner end $D'_A$ of the first rim seat (13'). The two seats being, axially to the inside, extended by frustoconical portions (17, 14) of a height at least equal to 0.01 times the minimum diameter of the bearing surface (11), and the generatrices of which form with the axis of rotation angles α at least equal to 45°. The rim bearing surface (11) is provided with at least one circumferential protuberance (115) arranged in a circumferential groove (30) of the radially inner face of the tread bearing support S, such that the protuberance (115) axially comes to bear and butt up against at least one lateral wall of the groove (30).

8 Claims, 1 Drawing Sheet

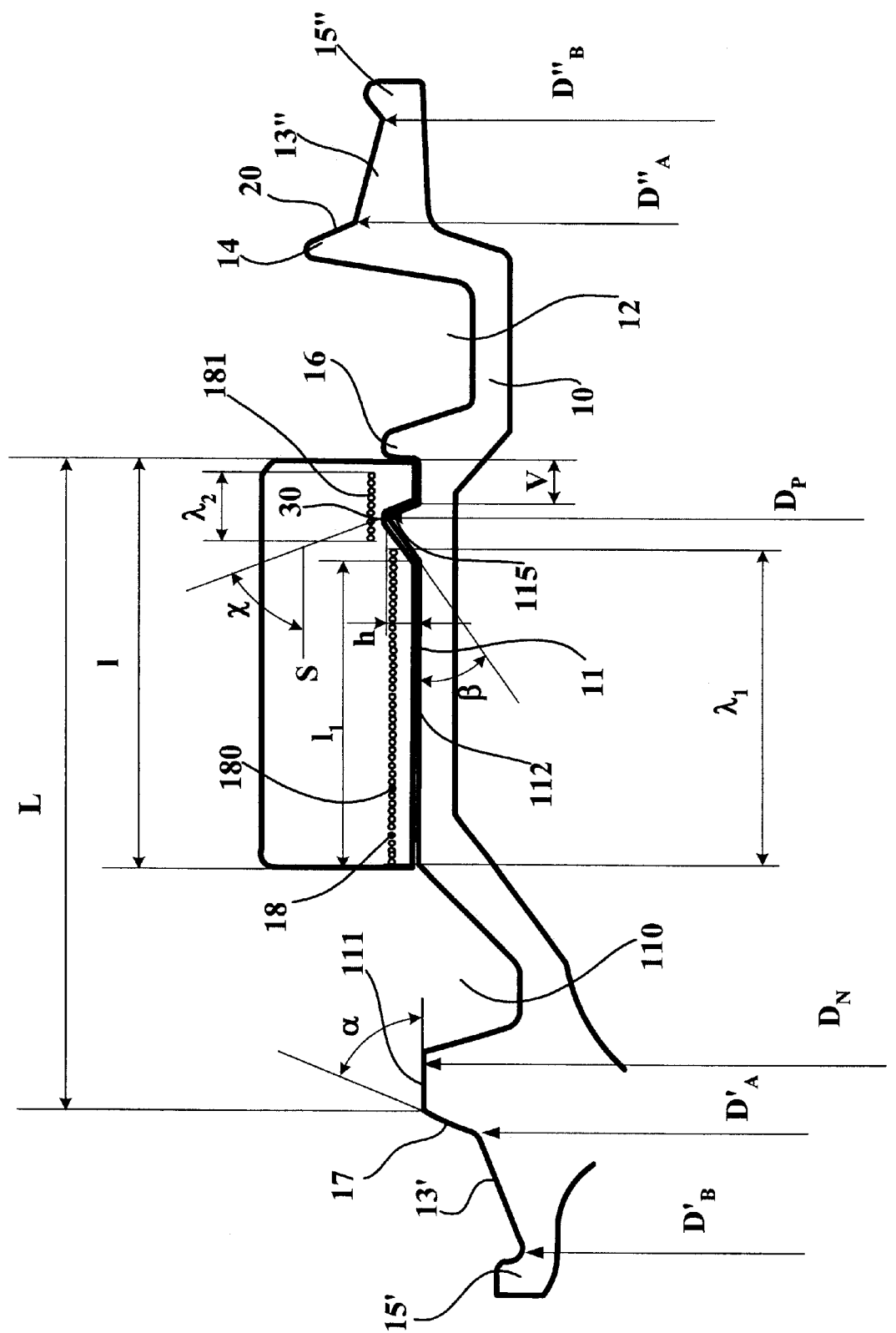

ASSEMBLY CONSISTING OF A RIM AND A BEARING SUPPORT

TECHNICAL FIELD OF THE INVENTION

The present invention relates to an assembly including a wheel or an integral rim, for mounting a tire, and a tread support ring, which assembly is particularly useful in the case of a tire travelling at an abnormally low inflation pressure compared with the recommended pressure or even at zero inflation pressure. It also relates to the mounting rim as such, and to the tread-bearing support as such.

BACKGROUND OF THE INVENTION

The main difficulties encountered in the case of travelling with a flat tire or at low pressure relate to the risk of unwedging of the beads of the tire, and in particular the unwedging of the bead of the tire located on the outside of the vehicle. The well-known proposed techniques for avoiding such unwedging, and in particular that consisting of arranging axially to the inside of the outer rim seat a protrusion or hump of low height, do not appear to give complete satisfaction and tend to increase the difficulties of mounting and dismounting the tires.

Patent EP 0 673 324, in order to overcome the above difficulties, describes a rolling assembly including a tire and an integral rim with two rim seats which are described as inclined towards the outside and extended axially towards the outside by two protrusions or humps of low height. The seat of the rim that will be located to the outside of the vehicle is extended axially towards the inside by a bearing surface intended and suitable to receive a tread-bearing support. The rim seat located to the inside of the vehicle is extended axially towards the inside by a rim flange, which flange is connected to the bearing surface by means of a mounting groove. The preferred variant of the rim comprises two seats inclined towards the outside and of unequal diameters, the seat located to the outside of the vehicle having a diameter less than the diameter of the seat located to the inside of the vehicle. The tread-bearing support of the assembly is made of elastically deformable, ovalisable elastomeric material that can be slipped on to the bearing surface. The tread-bearing support, as its name indicates, has the effect of preventing collapse of the tread in the event of inflation pressure loss, and thus permits the tire to travel at an acceptable deflection despite the lack or absence of inflation gas, while securely holding the outer bead of the tire in position on its rim seat.

Although it represents an enormous advance over the previously known systems for travel under conditions of low or zero inflation, which may be referred to as "travel in degraded mode", and at the same time permits excellent performance during normal travel, the assembly described above has the disadvantage of being heavy.

For a consequent reduction in weight, it is possible to act effectively on the two elements of the assembly, namely the rim and the tread-bearing support. European applications EP 0 807 539 and EP 1098779 describe such lighter-weight rims which comprise either a bearing surface provided with a large number of recesses, or a bearing surface which amounts to two circumferential bearing zones separated axially by a circumferential groove. As for the tread-bearing support, it has been made significantly lighter by replacing a major part of the solid body, between the base and the apex of the support, with numerous recesses separated by solid partitions, of suitable form and position. European Application EP 1000774 and International Application WO 00/76791 describe such supports, which are also used for blocking at least the tire bead mounted on the rim seat located to the outside of the vehicle, which is of smaller diameter.

International Application WO 01/08905, in order to obtain a more lightweight assembly, proposes reducing the width of the tread-bearing support relative to the width of the support-bearing surface, and describes the means necessary for axially holding the tread-bearing support. Such means consists of providing the radially inner face of the support with at least one protuberance, which protuberance butts up against the wall(s) of (a) circumferential groove(s) formed in the bearing surface of the rim, which bearing surface is intended precisely to receive the tread-bearing support. Providing a metallic object with grooves, and more particularly a mounting rim for a tire, has several drawbacks: it is not always easy to form such grooves owing to the manufacturing process for the rim, and this is even more difficult when the groove(s) is (are) of small dimensions. Furthermore, any groove includes the presence of a groove bottom with connecting fillets, whether circular or not, and fillets of small dimension generally entail a concentration of stresses and the possibility of cracks appearing in the fillets.

SUMMARY OF INVENTION

In order to make an assembly of the type in question, i.e., formed of a rim comprising a tread-support bearing surface located between first and second rim seats and of a tread-bearing support, lighter, while overcoming the aforementioned drawbacks and thus permit better fatigue resistance of the mounting rim, the invention proposes providing the rim bearing surface, which is intended to receive the tread-bearing support, with a circumferential protuberance or rib which is housed in a groove in the radially inner face of the tread-bearing support.

The assembly according to the invention, therefore, includes an elastically deformable, circumferentially inextensible tread-bearing support, which can be slipped on to a suitable rim bearing surface extending a first rim seat axially towards the inside, and the minimum diameter of which is at least equal to the diameter of any rim part between the axially outer end of the bearing surface and the end of the protrusion or hump of low height, axially extending to the outside the first rim seat which is inclined towards the outside, a second rim seat having, viewed in meridian section, a generatrix, the axially inner end of which is located on a circle of diameter greater than the diameter of the circle on which is located the axially inner end of the first rim seat, the two seats being, axially to the inside, extended by frustoconical portions of a height at least equal to 0.01 times the minimum diameter of the bearing surface and the generatrices of which form with the axis of rotation angles α at least equal to 45°, wherein the rim bearing surface is provided with at least one circumferential protuberance of height h, arranged in a circumferential groove in the radially inner face of the tread-bearing support, such that the protuberance axially comes to bear against, and butt up against, at least one lateral wall of the groove.

As used herein, the term "minimum diameter" of the rim bearing surface, as measured in the plane parallel to the equatorial plane containing that circular end of the rim bearing surface that is closest to the first rim seat, is to be understood to mean the maximum distance between two diametrically opposed points of such circular end.

As used herein, the term "protrusion or hump of low height", taking into account the dimensions of the rims in question and the dimensions of the tires required to be mounted on such rims, is to be understood to mean a protrusion or hump, the height of which is at most equal to 2.5% of the minimum diameter of the rim bearing surface.

The circumferential protuberance is preferably of low axial and radial dimensions, such dimensions being between 0.005 and 0.02 times the diameter of the rim bearing surface. The protuberance of the rim bearing surface then becomes lodged in the groove, substantially of the same dimensions, in the inner face of the tread-bearing support and butted up against the two lateral walls of the groove.

The circumferential groove of the tread-bearing support may, on the other hand, be of relatively large dimensions. A protuberance of the rim bearing surface may then come axially into contact with, and butt up against, a single one of the walls of the circumferential groove.

To avoid excessive difficulties in mounting the tread-bearing support on the rim bearing surface, it is in all cases advantageous for the axial distance between (1) the end, taken on the generatrix of the bearing surface, of the generatrix of the circumferential bearing groove closest to the second rim seat, and (2) the axial end of the tread-bearing support closest to the same second seat, to be at most equal to 0.3 times the axial width 1 of the radially inner face of the tread-bearing support.

To the same effect, the tread-bearing support is reinforced, in its radially inner part, by an armature of reinforcement elements which is divided into two parts: a first part axially on the side of the first rim seat, located at a radial distance from the base of the tread-bearing support which is at most equal to the height h of the protuberance, and a second part axially on the side of the second rim seat, which is located radially at a distance from the base of the support that is greater than the height h of the protuberance.

Still with the aim of facilitating mounting of the tread-bearing support on the rim bearing surface, the protuberance of the bearing surface preferably has a meridian section, the lateral face of which closest to the first rim seat is of frustoconical shape and has a generatrix which forms with the axis of rotation of the assembly an angle $\beta$ which may be between 15 and 45°. The lateral face of the protuberance closest to the second rim seat is also of frustoconical shape, and has a frustoconical generatrix which forms with the axis of rotation an angle $\chi$ of between 70 and 90°, the two generatrices possibly being joined by a circular arc or a straight-line segment. It is understood that the boundaries may be taken by the angles $\beta$ and $\chi$.

Preferably, the maximum diameter of the protuberance of the bearing surface is at most equal to the diameter of the axially outer end of the second rim seat, with the aim of not creating difficulties in mounting the tire, which is intended to complete the assembly.

BRIEF DESCRIPTION OF THE DRAWING

The invention will be better understood with reference to the accompanying drawing, in which FIG. 1 shows diagrammatically, viewed in meridian section, a non-limitative example of an embodiment of an assembly according to the invention, consisting of a rim and a tread-bearing support for mounting a tire.

DESCRIPTION OF ILLUSTRATIVE EMBODIMENT

FIG. 1 shows, viewed in meridian section, an integral rim 10, such as is disclosed in patent application EP 1098779, knowing that the rim may be formed with a disc an integral wheel or that the disc may be produced independently of the rim and joined to the rim thereafter. The rim 10 comprises two frustoconical rim seats 13' and 13" of unequal diameters, respectively $D'_A$ and $D''_A$. As used herein, the term "diameter of a frustoconical rim seat," is to be understood to mean the diameter of its largest circular end. The generatrices of the two seats 13' and 13" are inclined towards the outside, the diameters $D'_A$ and $D''_A$ respectively, of their axially inner ends being greater than the diameters $D'_B$ and $D''_B$, respectively, of their axially outer ends. The two frustoconical seats 13' and 13" are extended axially towards the outside by two protrusions or humps 15' and 15", respectively, the heights of which, measured perpendicular to the axis of rotation, are equal to, in the embodiment illustrated, 5.7 mm. The first seat 13', which is intended to be mounted on the outside of the vehicle to be fitted with such assemblies, is extended axially to the inside by a frustoconical part 17, the generatrix of which forms with a line parallel to the axis of rotation an angle $\alpha$, which is open axially towards the inside and radially towards the outside, of 45° and the height of which, measured perpendicular to the axis of rotation, is equal to 4.0 mm. The axially inner end of the generatrix of the part 17 is also the axial end of the rim bearing surface 11 towards the outside of the vehicle. The bearing surface 11, of diameter $D_N$, is formed of two bearing zones 111 and 112 separated by a first circumferential groove 110. The width L of the bearing surface is the axial distance between the ends axially farthest from the bearing zones 111 and 112. The bearing zone 112, which is axially closest to the second rim seat 13" intended to be mounted on the inside of the vehicle, has at its end closest to the seat 13" a protrusion or positioning stop 16, intended to avoid axial displacement towards the inside of the tread bearing support S arranged on the rim bearing surface 11. The second seat 13" is extended axially towards the inside by a flange 14, the axially outer wall 20 of which flange 14 is similar to the frustoconical part 17 extending the seat 13'. This flange 14 has a height of 4.0 mm in the example shown, that is to say, equal to the height of the axially inner frustoconical portion 17 of the first seat 13'. The flange 14 defines, with the positioning stop 16, a mounting groove 12 for positioning the tire bead that will be mounted on the seat 13".

The bearing surface 11 is provided, on the bearing zone 112, with a protuberance 115 which, when viewed in meridian section, is in the form of a triangle having a rounded apex. The protuberance face axially closest to the first rim seat 13' has a frustoconical generatrix forming with the axis of rotation of angle $\beta$ of between 15° and 45°, e.g., 40° as shown, which is open axially towards the outside and radially towards the inside, whereas the face axially closest to the second rim seat 13" has a generatrix forming with the axis of rotation an angle $\chi$ of between 70° and 90°, e.g., 80° as shown. These two generatrices are joined by a circular arc or a straight-line segment. It will be understood by those skilled in the art that the protuberance 115 may have a different meridian form, and in particular a semicircular form. The protuberance 115 is of low axial and radial dimensions, such dimensions being between 0.005 and 0.02 times the diameter $D_N$ of the bearing surface 11. As shown, the protuberance 115 has a height h equal to 4.5 mm, that is to say, substantially of the same value as the height of the protrusions 15' and 15", and a diameter $D_P$ at its apex at most equal to, and preferably less than, the diameter $D''_B$ of the axially outer end of the seat 13". The foregoing characteristics permit easy mounting, on one hand, of the tread-bearing support S on the rim bearing surface 11, and, on the other hand, of a tire on the rim 10. The radially lower face of the bearing support S is provided with a groove 30, which is of the same shape as the protuberance 115 and has substantially the same dimensions. The axial distance V between the end, taken on the bearing zone 112, of the frustoconical generatrix of the groove 30 of the support S closest to the second rim seat 13" and the axial end of the support S closest to the same second seat is equal to or less than 0.3 times, e.g. 0.2 times as shown, the axial width 1 of the radially inner face of the tread-bearing.

The support S is reinforced at its base by a reinforcement armature 18 of inextensible reinforcement elements formed of two parts. A first part 180 is located axially closest to the first rim seat 13'. The part 180, upon mounting of the support S on the rim bearing surface 11, does not cross the protuberance 115. It has an axial width $\lambda_1$ which is slightly greater than the axial distance $1_1$ between the end of the inner face of the support S which is closest to the first rim seat 13' and the end of the frustoconical wall of the groove 30 which is inclined by an angle β relative to the axis of rotation. The reinforcement elements of the part 180 are radially above the face of the support S and distant from that face by a quantity equal to 2 mm, less than the height h of the groove 30.

A second part 181 of the reinforcement armature 18 is located axially closest to the second rim seat 13". The part 181, upon mounting of the support S on the rim bearing surface 11, crosses the protuberance 115. It has an axial width $\lambda_2$ which is slightly greater than the axial distance V between the end of the inner face of the support S which is closest to the second rim seat 13" and the end of the frustoconical wall of the groove 30 which is inclined by an angle χ axially farthest away from the second rim seat 13". The reinforcement elements of the part 181 are radially above the face of the support S and distant from that face by a quantity equal to 5 mm, greater than the height h of the groove 30.

Although the invention has been described and illustrated herein by reference to a specific embodiment thereof, it will be understood that such embodiment is susceptible of modification and variation without departing from the inventive concepts disclosed. For example, unless otherwise stated, the specific values of the dimensions, angles and proportions given for the embodiment of FIG. 1 are intended to be illustrative and not limiting. All such modifications and variations, therefore, are intended to be included within the spirit and scope of the appended claims.

What is claimed is:

1. An assembly comprising:
   a rim, having a first rim seat inclined towards the outside, a second rim seat and a bearing surface disposed axially inwardly of the first rim seat, a protrusion or hump of low height axially adjoining the outside of the first rim seat, the minimum diameter $D_N$ of the bearing surface being at least equal to the diameter of any rim part between the axially outer end of the bearing surface and the end of said protrusion or hump of low height, the second rim seat having, viewed in meridian section, a generatrix having an axially inner end located on a circle of diameter $D''_A$ greater than the diameter $D'_A$ of the circle on which is located the axially inner end of the first rim seat, the first and second rim seats being adjoined, axially to the inside, by frustoconical portions of a height at least equal to 0.01 times the minimum diameter $D_N$ of the bearing surface, the frustoconical portions forming with the axis of rotation angles α at least equal to 45°, the bearing surface being provided with at least one circumferential protuberance of height h; and an elastically deformable, circumferentially inextensible tread-bearing support S, the tread-bearing support S having on its radially inner face a circumferential groove provided with lateral walls, the tread-bearing support S being able to be slipped on the rim bearing surface so that the protuberance axially comes to bear against at least one lateral wall of the groove.

2. An assembly according to claim 1, wherein the circumferential protuberance is of low axial and radial dimensions, said dimensions being between 0.005 and 0.02 times the diameter $D_N$ of the support bearing surface.

3. An assembly according to claim 1, wherein the maximum diameter $D_P$ of the protuberance of the bearing surface is equal to or less than the diameter $D''_B$ of the axially outer end of the second rim seat.

4. An assembly according to claim 1, wherein the protuberance of the bearing surface comprises two lateral faces, the lateral face closest to the first rim seat being of frustoconical shape having a generatrix which forms with the axis of rotation of the assembly an angle β of between 15 and 45°, and the lateral face closest to the second rim seat being of frustoconical shape having a generatrix which forms with the axis of rotation an angle χ of between 70 and 90°.

5. An assembly according to claim 4, wherein the two generatices of the lateral faces of the protuberance are joined by a circular arc segment.

6. An assembly according to claim 1, wherein the end of the circumferential groove closest to the second rim seat is defined by a generatrix, and the axial distance V between the end, taken on the generatrix of the bearing surface, of said generatrix of the circumferential groove closest to the second rim seat and the axial end of the tread-bearing support closest to the second rim seat is equal to or less than 0.3 times the axial width 1 of the radially inner face of the bearing support.

7. An assembly according to claim 6, wherein the tread-bearing support S is reinforced, in its radially inner part, by an armature of inextensible reinforcement elements, the armature being divided into two parts, a first part located axially on the side of the first rim seat and at a radial distance from the radially-inner surface of the bearing support S which is equal to or less than the height h of the protuberance, and a second part located on the side of the second rim seat and at a radial distance from the radially-inner surface of the support S which is greater than the height h of the protuberance.

8. An assembly according to claim 4, wherein the two generatrices of the lateral faces of the protuberance are joined by a straight-line segment.

* * * * *

UNITED STATES PATENT AND TRADEMARK OFFICE
CERTIFICATE OF CORRECTION

PATENT NO. : 6,609,549 B2
DATED : August 26, 2003
INVENTOR(S) : Abinal et al.

It is certified that error appears in the above-identified patent and that said Letters Patent is hereby corrected as shown below:

<u>Title page,</u>
Item [57], ABSTRACT,
Line 2, "on to" should read -- onto --

<u>Column 1,</u>
Line 7, "rim," should read -- rim --
Line 41, "ovalisable" should read -- ovalizable --
Line 42, "on to" should read -- onto --
Line 46, "deflection" should read -- deflation --

<u>Column 5,</u>
Line 9, "width 1" should read -- width l -- (lower case "L")
Line 17, "distance $\mathbf{1}_1$" should read -- distance $l_1$ -- (lower case "L"-sub one)
Line 23, "2 mm, less" should read -- 2 mm less --
Line 35, "5 mm, greater" should read -- 5 mm greater --

<u>Column 6,</u>
Line 33, "generatices" should read -- generatrices --
Line 42, "width 1" should read -- width l -- (lower case "L")
Line 49, "radially-inner" should read -- radially inner --
Line 52, "radially-" should read -- radially --

Signed and Sealed this

Sixteenth Day of December, 2003

JAMES E. ROGAN
*Director of the United States Patent and Trademark Office*